US008216103B1

(12) United States Patent
Boczula

(10) Patent No.: US 8,216,103 B1
(45) Date of Patent: Jul. 10, 2012

(54) BIDIRECTIONAL DRIVE FOR PRODUCING UNIDIRECTIONAL VEHICLE MOVEMENT

(76) Inventor: Krzysztof Boczula, Calgary (CA)

( * ) Notice: Subject to any disclaimer, the term of this patent is extended or adjusted under 35 U.S.C. 154(b) by 517 days.

(21) Appl. No.: 12/456,011

(22) Filed: Jun. 9, 2009

(51) Int. Cl.
*F16H 3/72* (2006.01)
*F16H 37/06* (2006.01)
*F16H 35/02* (2006.01)
*F16H 37/12* (2006.01)
*B60K 1/00* (2006.01)

(52) U.S. Cl. .................... 475/14; 475/4; 475/5; 74/661; 180/65.6; 180/65.7

(58) Field of Classification Search .................... 475/14, 475/225, 230, 231, 249, 289, 303, 4, 5; 74/661, 74/670; 180/65.6, 65.7
See application file for complete search history.

(56) References Cited

U.S. PATENT DOCUMENTS

| | | | | |
|---|---|---|---|---|
| 4,065,984 | A * | 1/1978 | Nakajima | 475/285 |
| 4,706,982 | A * | 11/1987 | Hartmann | 280/238 |
| 4,826,190 | A * | 5/1989 | Hartmann | 280/236 |
| 4,854,191 | A * | 8/1989 | Nagano | 475/289 |
| 4,900,045 | A | 2/1990 | Myers, Sr. | |
| 5,762,350 | A | 6/1998 | Jolly | |
| 6,258,005 | B1 * | 7/2001 | Rohloff | 475/277 |
| 6,387,008 | B1 * | 5/2002 | Chen et al. | 475/296 |
| 6,932,370 | B2 | 8/2005 | Jones et al. | |
| 7,370,873 | B2 * | 5/2008 | Hong | 280/260 |
| 2010/0170731 | A1 * | 7/2010 | Jordan | 180/65.7 |

* cited by examiner

*Primary Examiner* — Tisha Lewis
(74) *Attorney, Agent, or Firm* — Patent Law & Venture Group; Gene Scott

(57) ABSTRACT

A mechanical drive uses two rotational clutches mounted in spaced apart positions on a common axle. Two sun gears are engaged respectively with the rotational clutches. A set of planet gears is engaged, with at least one of the planet gears meshed with each one of the sun gears. An internal tooth ring gear is meshed with at least two of the planet gears, wherein one of the planet gears is directed to each one of the sun gears. The planet gears are configured so that motion of the ring gear is transmitted to the two sun gears in opposing rotational senses and the rotational clutches are oriented for locking when under opposite rotational motions, whereby, reciprocating cyclic motion of the ring gear is transmitted to the common axle as continuous rotation in a singe rotational sense.

10 Claims, 5 Drawing Sheets

BIDIRECTIONAL DRIVE FOR PRODUCING UNIDIRECTIONAL VEHICLE MOVEMENT

CROSS-REFERENCE TO RELATED APPLICATIONS

This application is a non-provisional application describing the same invention as a prior filed provisional application Ser. No. 60/820,465, filed on Dec. 19, 2006, and which expired on Dec. 19, 2007.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

REFERENCE TO A "MICROFICHE APPENDIX"

Not applicable.

SEQUENCE LISTING

Not applicable.

BACKGROUND OF THE INVENTION

1. Field of the Present Disclosure

This disclosure relates generally to mechanical drive systems and more particularly to such systems having application to vehicles and especially to manually driven light vehicles such as bicycles, and including stationary exercise equipment.

2. Description of Related Art Including Information Disclosed Under 37 CFR 1.97 and 1.98

Drives are known for human powered vehicles, such as bicycles, wheelchairs and the like. Such drives are typically rotary and transmit motion from a manually driven crank, such as through foot-operated pedals, to a driven wheel of the vehicle, normally the rear wheel. A variety of drive sprocket mechanisms are known such as the well known and widely used conventional nested gears with a chain derailleur. Further, various types of ratcheting gear drive mechanisms are known. Drives are also known which are hand-operated to derive unidirectional motion from one or more reciprocating handles, each providing a single power stroke, such as when a handle is pushed or pulled in one direction but is free-wheeling in the opposite. In the prior art case where there are two handles, each of the handles provides a power stroke in only one direction and freewheels in the other, thereby producing a power stroke sequentially.

Jones, et al., U.S. Pat. No. 6,932,370 discloses a human-powered, ride-on vehicle, including a main longitudinal frame member having a steering/drive mechanism mounted thereon for oscillating movement; a driven rear wheel having an axle, a rear sprocket operatively fixed to the rear wheel for coasting; a pair of spaced apart, steerable front wheels located adjacent to one end of the main longitudinal frame member and operatively connected to the steering/drive mechanism. The steering/drive mechanism includes: a teeter arm mounted to the main longitudinal frame member intermediate the ends thereof for pivoting movement in a fore direction and an aft direction; a drive mechanism including first and second drive linkages, wherein the first drive linkage provides a motive force to the driven rear wheel during a first power stroke and the second drive linkage provides a motive force to the driven rear wheel during a second power stroke, and wherein, for equal movement of the teeter arm in the fore and aft directions.

Jolly U.S. Pat. No. 5,762,350 discloses a hand operated wheel chair or exercise machine. The machine uses two racks to operate two one way clutches to furnish forward motion from both the forward and backward strokes of the input lever arm. The mechanical advantage of the input lever arm is readily changeable to affect the overall gear ratio of the drive. Steering is accomplished by turning a wheel on the lever arm. The control is similar to that on a wheel controlled airplane.

Myers, Sr. U.S. Pat. No. 4,900,045 discloses a drive device for a bicycle. The drive comprises a drive wheel assembly having two drive shafts and a drive wheel with dual ratchet assemblies, a vertical frame for mounting the drive wheel assembly in frictional engagement with the bicycle front tire and connected to a first horizontal bar, a vertical frame extension connected to the first horizontal bar. A second horizontal bar is attachable to a bicycle's handle bars. A pair of handles are slidably mounted on the second horizontal bar which is attached to a cable and pulley system that engages the drive wheel assembly. The system is capable of driving the device by reciprocal motion along the second horizontal bar wherein the motion of the handles causes the drive wheel, and hence the bicycle's front tire, to rotate.

The related art described above discloses human propelled, light weight vehicles with hand or foot actuated drive mechanisms. However, the prior art fails to disclose such a vehicle with separate left and right hand lever operated drives wherein both forward and backward movement of each hand lever produces forwardly directed propulsion of the vehicle. The present disclosure distinguishes over the prior art providing heretofore unknown advantages as described in the following summary.

BRIEF SUMMARY OF THE INVENTION

This disclosure teaches certain benefits in construction and use of the described invention which give rise to the objectives described below.

A mechanical drive uses two rotational clutches mounted in spaced apart positions on a common axle. Two sun gears are engaged respectively with the rotational clutches.

A set of planet gears is engaged, with at least one of the planet gears meshed with each one of the sun gears. An internal tooth ring gear is meshed with at least two of the planet gears, wherein one of the planet gears is directed to each one of the sun gears. The planet gears are configured so that motion of the ring gear is transmitted to the two sun gears in opposing rotational senses and the rotational clutches are oriented for locking when under opposite rotational motions, whereby, reciprocating cyclic motion of the ring gear is transmitted to the common axle as continuous rotation in a single rotational sense. When set-up in a bicycle, the drive enables the use of the arms for driving while the feet steer. When used as a stationary bicycle two reciprocating levers can be arranged to move forward and backward together simulating rowing motions, while when the levers are arranged to move in opposing directions, the equipment simulates cross country skiing motions.

A primary objective inherent in the above described apparatus and method of use is to provide advantages not taught by the prior art.

Another objective is to provide a mechanical drive system particularly applicable to light vehicles such as bicycles and exercise equipment.

A further objective is provide such a system that may be used in several alternative ways to achieve forward motion in a light vehicle or for working different muscle groups in a stationary version.

Other features and advantages of the present invention will become apparent from the following more detailed description, taken in conjunction with the accompanying drawings, which illustrate, by way of example, the principles of the presently described apparatus and method of its use.

BRIEF DESCRIPTION OF THE SEVERAL VIEWS OF THE DRAWING(S)

Illustrated in the accompanying drawings is at least one of the best mode embodiments of the present invention In such drawings.

Figure 4:
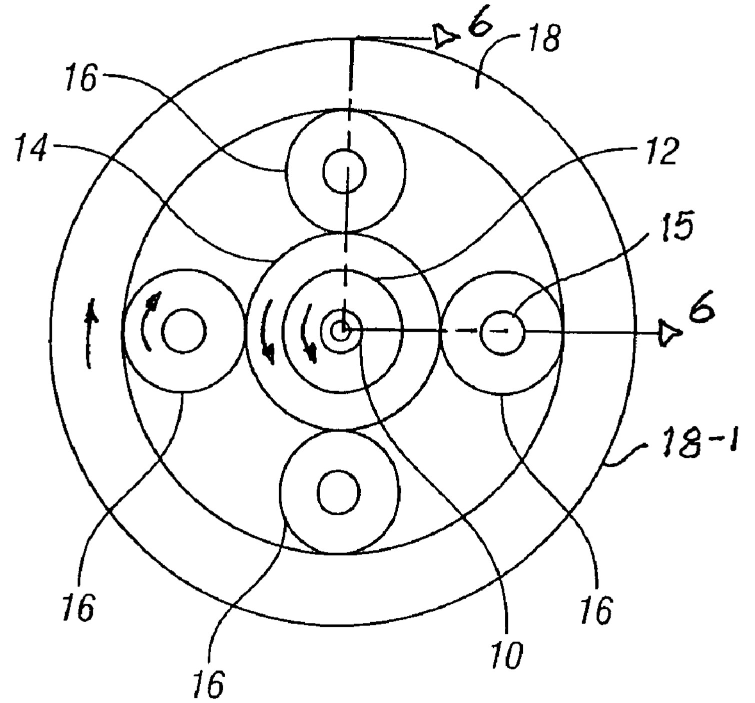
Figure 5:
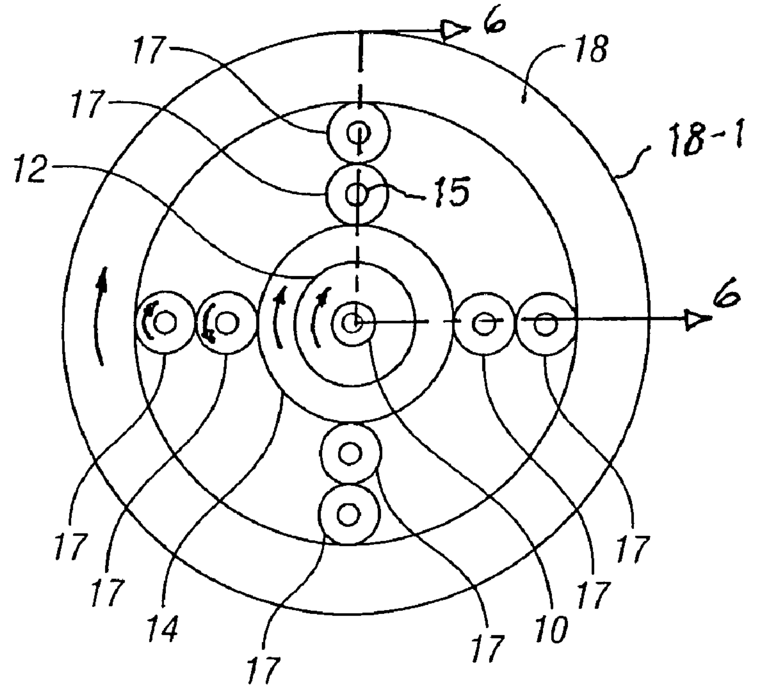
Figure 6:
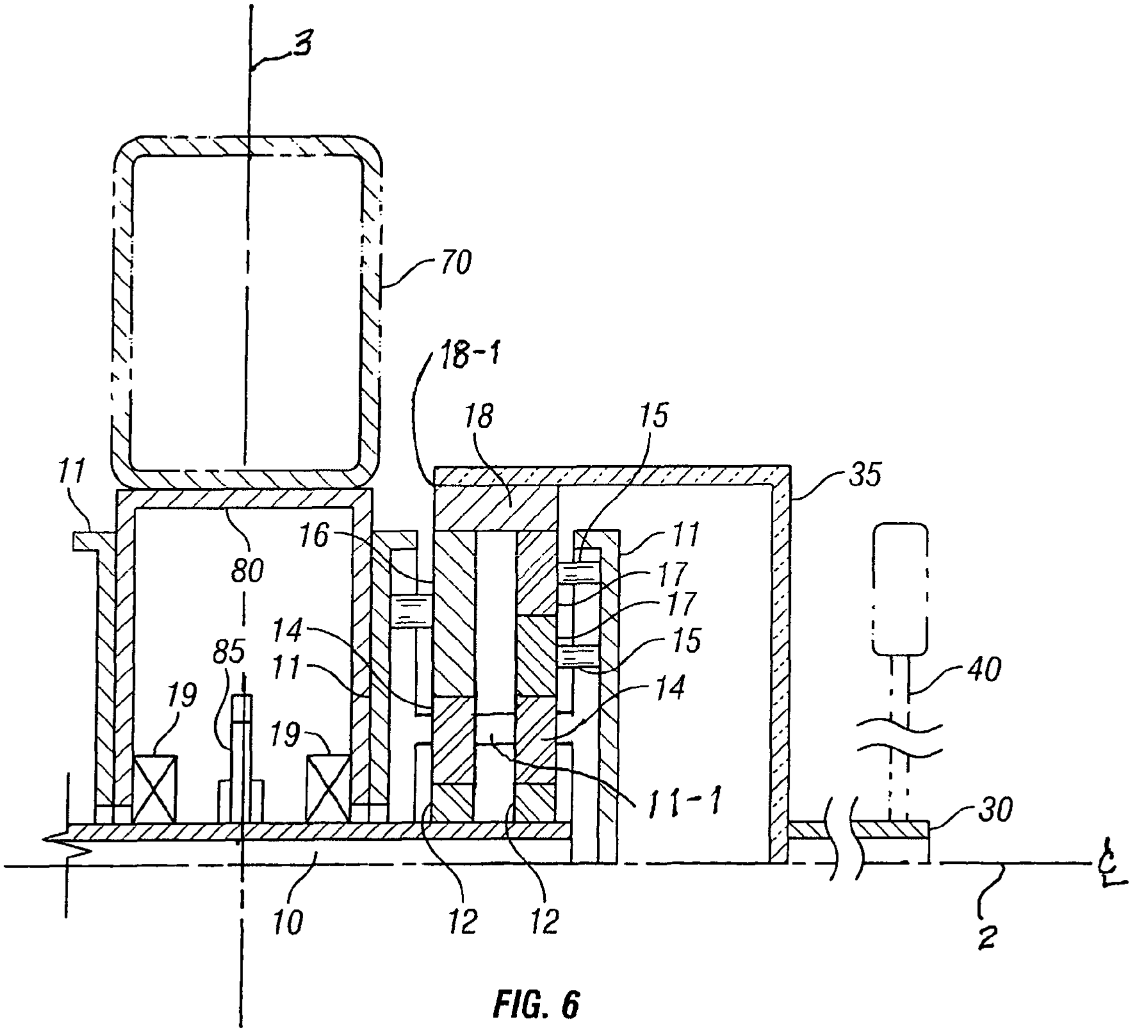

FIGS. 4 and 5 are elevational views in schematic form of a planetary gear arrangement thereof; and FIG. 6 is a cross section taken along cutting plane lines shown in FIGS. 4 and 5 and showing a largely right side half and upper half of a drive arrangement further detailed and defined in FIGS. 4 and 5.

DETAILED DESCRIPTION OF THE INVENTION

The above described drawing figures illustrate the described apparatus and its method of use in preferred embodiments, which are further defined in detail in the following description. Those having ordinary skill in the art may be able to make alterations and modifications to what is described herein without departing from its spirit and scope. Therefore, it should be understood that what is illustrated is set forth only for the purposes of example and should not be taken as a limitation on the scope of the present apparatus and its method of use. One of skill in the art would appreciate that the drive mechanism described herein would be suitable for powering a wheelchair or other human powered vehicle and for stationary applications such as exercise equipment, pumps, and generators. Drive mechanisms, according to embodiments of the present invention, permit rotation of a driven shaft in a single rotational sense through reciprocating motion of one or more levers, with drive power being delivered to a driven axle over the full cycle of their movement.

Figure 1:
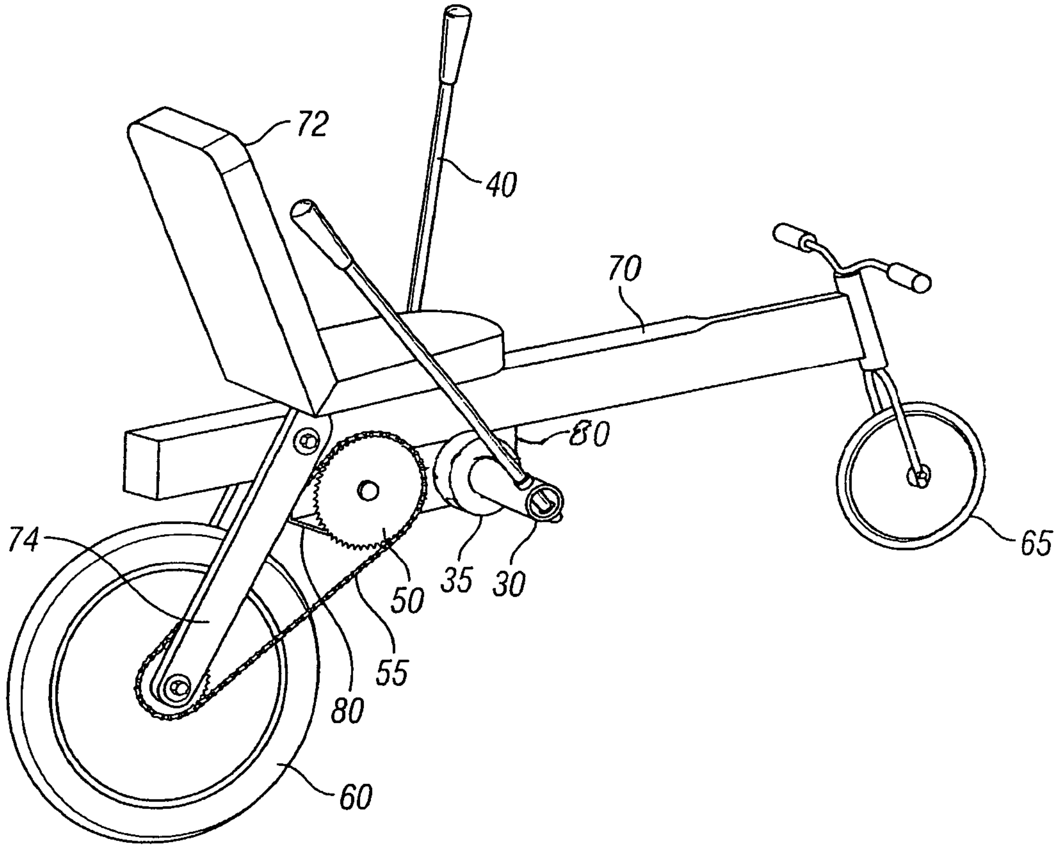
FIG. 1 is a perspective view of one embodiment of the present invention.

Referring now to FIG. 1, an embodiment of the present invention is shown; a bicycle exemplar. A drive sprocket 50 is linked to a rear wheel 60 by drive chain 55. Brackets 74 secure the rear wheel 60 in place relative to the frame of the bicycle 70. Two drive levers 40, one on each side of the frame 70 are joined to two mutually coaxial drive shafts 30, which is shown in detail in FIG. 2. A forward wheel and steering mechanism 65 are engaged forward on frame 70 as shown. An operator's seat 72 is mounted on frame 70.

Figure 2:
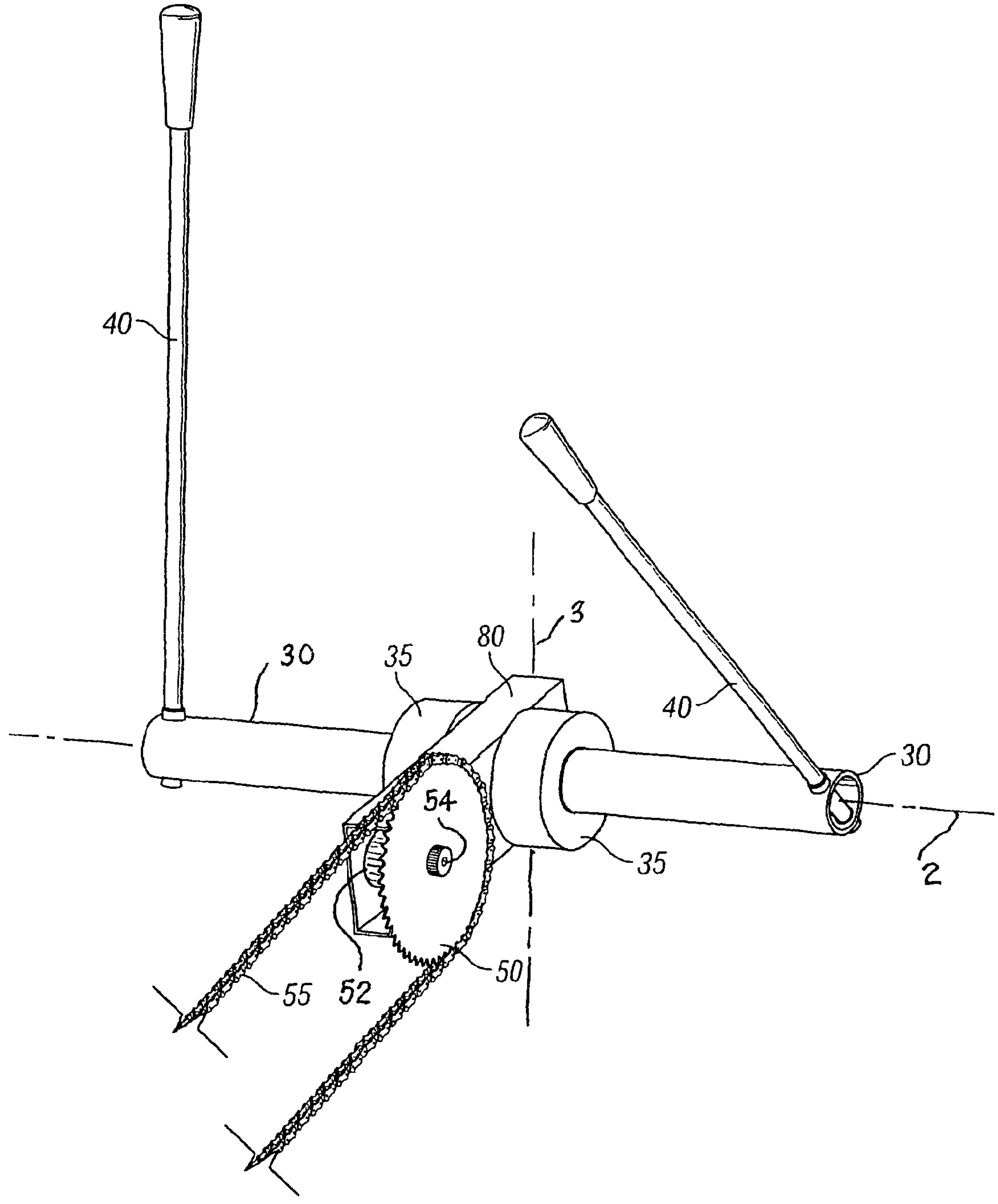
FIG. 2 is a perspective view of the drive system thereof.

In FIG. 2 we see the drive levers 40, drive shafts 30, and drive hubs 35, which are separate unitary assemblies on the left and on the right sides respectively of the vehicle, and motion of one of these assemblies does not effect the motion of the other, in fact the vehicle may be driven by either one of the drive levers 40 alone, or by both together as will be shown. Drive tube 80 supports drive sprocket 50 rotationally on sprocket axle 54 which is driven by spool 52 also mounted on axle 54 and positioned within drive tube 80. The bicycle frame 70 is not shown in FIG. 2 so that the relationship between the elements that are shown is clear. Vertical axis 3 is located on the longitudinal center of the vehicle separating the vehicle into left and right halves. Axle center line 2 is the rotational center of drive shafts 30.

Referring now to FIG. 6, we see that the drive hub 35 on the right side of frame 70 is fixedly engaged with an outer circular surface 18-1 of a ring gear 18, and ring gear 18 is therefore rotated in reciprocating rotary motion by drive hub 35 which is driven, in turn, by drive lever 40 and drive shaft 30. The left side of the vehicle is arranged in the same manner, so that the vehicle has two separate, manually driven engines, as will be described.

FIGS. 4 and 5 are elevational views of two planetary drive trains operatively engaged for producing smooth continuous forward drive thrust in the present invention. In FIG. 6; a vertical cross-sectional view taken along cutting plain lines 6-6 in FIGS. 4 and 5, we see the right side drive shaft 30 with its drive lever 40 (shown in phantom line). Notice that drive lever 40 is cut-away and thereby shown foreshortened. Lever 40 is actually of a more practical length as shown in FIG. 1 where mechanical advantage is gained by a relatively long moment arm. In FIG. 6 we also see that shaft 30 is cut-away, with FIG. 2 showing its practical length, although this length is not a critical factor of the present invention. Axle center line 2 divides shaft 30 in half as well as driven shaft 10 which is aligned coaxially with respect to both the left and right drive shafts 30. Here, we also see drive tube 80, which is mounted to, albeit under, bicycle frame 70 (shown in phantom line). FIG. 1 clearly shows the relationship between frame 70 and drive tube 80. In FIG. 6, vertical axis 3 defines the center of left-right symmetry of the gear drives of the present invention. It should be noted that to the right of vertical axis 3 is shown the complete right side of the drive motor of the present invention, while to the left of center line 3, although not fully shown, there is an identical element arrangement, i.e., a mirror image of the right side defining a second drive motor. Likewise, axle center line 2 separates the up-down symmetry of the present drive motors with the upper-right side portion of the invention shown, as described above, and an identical lower portion, that is, a mirror image of the upper portion not shown. Please note that the up-down symmetry does not include the bicycle frame 70 and lever 40, both of which, as stated, are shown in phantom line to indicate that, in this view, they are shown for reference only.

Now continuing with reference to FIG. 6, we see that a set of drive elements are defined. Driven shaft 10 is mounted within two rotary bearing sets 19 of any common and well known type, which are secured to drive tube 80. Therefore, shaft 10 is free to rotate about axle center line 2. Mounted fixedly to driven shaft 10 are a pair of spaced apart rotational clutches 12. The actual interior clutch mechanisms are not shown in detail as any number of types of such clutches are well known in the art. An example of such a rotary clutch, as is preferably used in the present invention, is defined in publication WO/1999/036709, the relevant disclosure of which is included by reference herein. The clutches 12, like bearing sets 19 have an inner race and an outer race. Clutches 12 are designed to lock the inner and outer races when rotation of the device is urged in a forward rotational sense, and to freewheel or coast when rotation of the device is urged in a reverse rotational sense. These clutches 12 are toroidal in shape with shaft 10 mounted coaxially therein. Elements 14, 16, 17 and 18 are spur gears arranged in two side-by-side, planetary drive trains, which, referring to the right side of the present invention we shall refer to as, the inboard drive train (closer to frame 70) and the outboard drive train (further away from the frame 70). These drive trains are shown schematically for relative placement indicated but with pitch circles, addendums, dedendums and pitch points not defined. However, it is important to state that the teeth of these gears are meshed. Two sun gears 14 are fixedly engaged with the two rotational clutches 12 so that sun gears 14, clutches 12 and driven axle 10 all have a mutually concentric relationship. As previously mentioned, FIG. 4 shows the inboard planetary drive train, while FIG. 5 shows the outboard train. Referring to FIGS. 4 and 5, we see that the two drive trains are not identical. The planetary spur gears are arranged so that as the ring gear 18, which is common to both inboard and outboard drive trains, rotates clockwise, the outer race of the rotational clutch 12 in FIG. 4 rotates counter-clockwise, while in FIG. 5 it rotates clockwise. Those familiar with spur gear drive trains will understand this relationship which is clear from the rotational directions indicated by the arrows shown.

Figure 3:
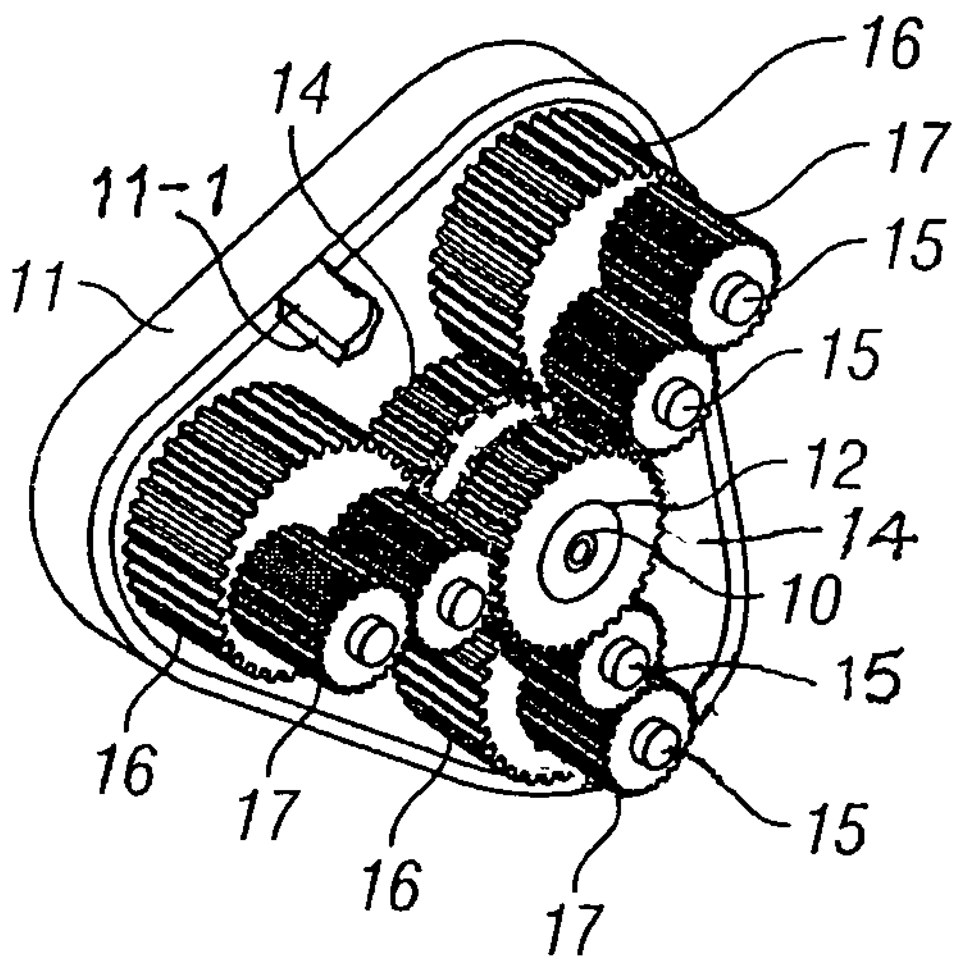
FIG. 3 is a perspective view of the gear arrangement thereof with ring gear and housing removed for clarity.

In FIG. 6 we see that on the left and right sides of the planetary gear trains are left and right portions of gear housing 11. Gear shafts 15 of the planet gears 16 and 17 are supported for rotation by gear housing 11 and the left and right portions are joined by tabs 11-1, one of which is shown in FIG. 6. Gear housings 11, as previously indicated, are mounted on opposing sides of drive tube 80. In FIGS. 4 and 5, four planetary drive trains are shown between ring gear 18 and sun gears 14. However, less or more than four such drive trains may be used as shown in FIG. 3 where ring gear 18 is omitted in order to show detail of the planetary gears 16 and 17, and their relationship with sun gears 14. In FIG. 3 one side of gear housing 11 is shown. It is clear from this figure that gear housings 11 do not obstruct ring gear 18 in its mounted position where it meshes with spur gears 16 and 17. In FIG. 6 we see that a second drive sprocket 85 is secured on driven axle 10 between bearing sets 19. A drive linkage (not shown) of any type is mounted between second drive sprocket 85 and spool 52 so as to deliver forward thrust through drive sprocket 50 to the rear wheel 60. This preferred arrangement for drive motion takeoff from the driven axle 10 is considered to be novel. However, there are alternative ways of using the rotation of driven axle 10 for moving a light weight vehicle or for exercising the arms.

Operation of the above described bicycle embodiment of the present invention, as depicted in FIG. 1, requires an operator (not shown) to sit on operator's seat 72 and grasp each of the drive levers 40, one with each hand. The operator's feet would be placed on the handle bars of forward wheel and steering mechanism 65 to enable steering of the vehicle. The bicycle is propelled by pressing drive levers 40 forward and then rearward in repeating cycles. Since the vehicle has drive motor left-right symmetry, we can discuss the right side operation and it will apply, to the left side as well. When the drive lever 40 on the right side of the vehicle is pushed forward, it rotates drive shaft 30 clockwise as seen by a viewer on the right side of the vehicle who is sighting along axle center line 2. Since drive shaft 30 is integral with drive hub 35 and ring gear 18, these elements rotate clockwise as well; see arrows on ring gear 18 in FIGS. 4 and 5. Referring to FIG. 4, we see that planet gears 16 also rotate in the clockwise sense, and this drives the sun gear 14 of this respective drive train, and also rotational clutch 12 in the counter-clockwise rotational sense as shown by arrows on these elements. Now, referring to FIG. 5, we see that as the ring gear 18 rotates CW, as before, the planet gears 17 that are meshed with the ring gear 18 also rotate CW, but the planet gears that are meshed with the sun gear 14, in this respective drive train, rotate CCW thereby driving the respective sun gear 14 and rotational clutch 12 CW.

In summary then, the two parallel drive trains operate in opposition although both driven by the same ring gear 18, rotating their respective rotational clutches 12 in opposite rotational senses. An opposite result is achieved when the handle 40 is drawn rearward, with the inside drive train rotating its clutch 12 CW and the outside drive train rotating its clutch 12 CCW. In this embodiment, again, referring to the right side of the vehicle, when the outside clutch is mounted on driven shaft 10 so as to lock during a forward thrust of drive lever 40, and the inside clutch 12 is mounted so as to lock during a rearward thrust of drive lever 40, then rotational thrust is delivered to shaft 10 during both forward and rearward motions of drive lever 40. A similar result is achieved on the left side of the vehicle so that both left and right arms of the operator may be used to drive the vehicle with thrust delivered by both handles 40 during both push and pull efforts by the operator with both arms.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. A mechanical drive comprising:

two rotational clutches mounted in spaced apart positions on a common axle;

two sun gears engaged respectively with the rotational clutches;

a set of planet gears, with at least one of the planet gears meshed with each one of the sun gears;

an internal tooth ring gear meshed with at least two of the planet gears, wherein one of the at least two of the planet gears is directed to each one of the sun gears;

the planet gears configured so that motion of the ring gear is transmitted to the two sun gears in opposing rotational senses;

the rotational clutches oriented for locking when under opposite rotational motions;

whereby, reciprocating cyclic motion of one of: the ring gear and a planet gear is transmitted to the common axle as continuous rotation in a single rotational sense.

2. The mechanical drive of claim 1 wherein the set of planet gears is arranged in three equally spaced radial trains.

3. The mechanical drive of claim 1 wherein the set of planet gears is arranged in four equally spaced radial trains.

4. The mechanical drive of claim 1 further comprising a lever engaged with the ring gear under a pivotal means functional for enabling the pivotal means to move in reciprocating motion.

5. The mechanical drive of claim 1 wherein the common axle communicates rotational motion to a drive wheel through a mechanical linkage.

6. A mechanical drive comprising:

two drive motors arranged in side by side positions, wherein each one of the drive motors has:

two rotational clutches mounted in spaced apart positions on a common axle;

two sun gears engaged respectively with the rotational clutches;

a set of planet gears, with at least one of the planet gears meshed with each one of the sun gears;

an internal tooth ring gear meshed with at least two of the planet gears, wherein one of the at least two of the planet gears is directed to each one of the sun gears;

the planet gears configured so that motion of the ring gear is transmitted to the two sun gears in opposing rotational senses;

the rotational clutches oriented for locking when under opposite rotational motions;

whereby, reciprocating cyclic motion of the ring gears is transmitted to the common axles as continuous rotation in a single, common rotational sense.

7. The mechanical drive of claim 6 wherein each set of planet gears is arranged in three equally spaced radial trains.

8. The mechanical drive of claim 6 wherein each set of planet gears is arranged in four equally spaced radial trains.

9. The mechanical drive of claim 6 further comprising a pair of levers, each said lever engaged with each ring gear under a pivotal means functional for enabling the pivotal means to move in reciprocating motion.

10. The mechanical drive of claim 6 wherein the common axle communicates rotational motion to a drive wheel through a mechanical linkage.

* * * * *